N. W. STORER.
ELECTRIC MOTOR DRIVE FOR LOCOMOTIVES AND OTHER RAILWAY VEHICLES.
APPLICATION FILED OCT. 7, 1908.

993,568.

Patented May 30, 1911.

3 SHEETS—SHEET 1.

WITNESSES:
C. L. Belcher

INVENTOR
Norman W. Storer
BY
Wesley G. Carr
ATTORNEY

N. W. STORER.
ELECTRIC MOTOR DRIVE FOR LOCOMOTIVES AND OTHER RAILWAY VEHICLES.
APPLICATION FILED OCT. 7, 1908.

993,568.

Patented May 30, 1911.

3 SHEETS—SHEET 3.

WITNESSES:

INVENTOR
Norman W. Storer
BY
ATTORNEY

UNITED STATES PATENT OFFICE.

NORMAN W. STORER, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

ELECTRIC-MOTOR DRIVE FOR LOCOMOTIVES AND OTHER RAILWAY-VEHICLES.

993,568.

Specification of Letters Patent.   Patented May 30, 1911.

Application filed October 7, 1908.   Serial No. 456,665.

*To all whom it may concern:*

Be it known that I, NORMAN W. STORER, a citizen of the United States, and a resident of Pittsburg, in the county of Allegheny and State of Pennsylvania, have invented a new and useful Improvement in Electric-Motor Drives for Locomotives and other Railway-Vehicles, of which the following is a specification.

My invention relates to electric locomotives and other railway vehicles and it has for its object to provide an improved driving connection between the electric motors and the driving wheels of the vehicle.

In Patent No. 894,915, granted August 4, 1908, to the Westinghouse Electric & Manufacturing Company, upon an application filed by me, is illustrated and described a resilient connection between an electric motor and the truck wheels or drivers of an electric locomotive or car which is especially adapted for use with very large motors. The motor shaft is provided with two pinions, on its respective ends, which mesh with gear wheels that are secured to a quill or sleeve. It has been found that, when gears are connected in multiple, as above indicated, they operate in an unsatisfactory manner and wear very rapidly unless the center lines of the shafts, which are operatively connected by the gears, are absolutely parallel and the gears are in alinement with each other.

It is obviously difficult to effect and maintain the above specified condition exactly and my present invention is an improvement in resilient connections between the motor armature and the driving shaft by means of which the gears tend to mesh properly and to equalize the load upon the two sets included in the multiple arrangement, even though the shafts connected by them are not parallel. The torque exerted by the motor may therefore be equally applied to both driving wheels of the axle on which the motor is suspended, thereby avoiding the strains which would otherwise be imposed upon the motor and upon the supporting truck when the driving gears are located at one end only of the motor shaft. Numerous other advantages are obtained by reason of the symmetry and flexibility of my structure.

Figure 1:
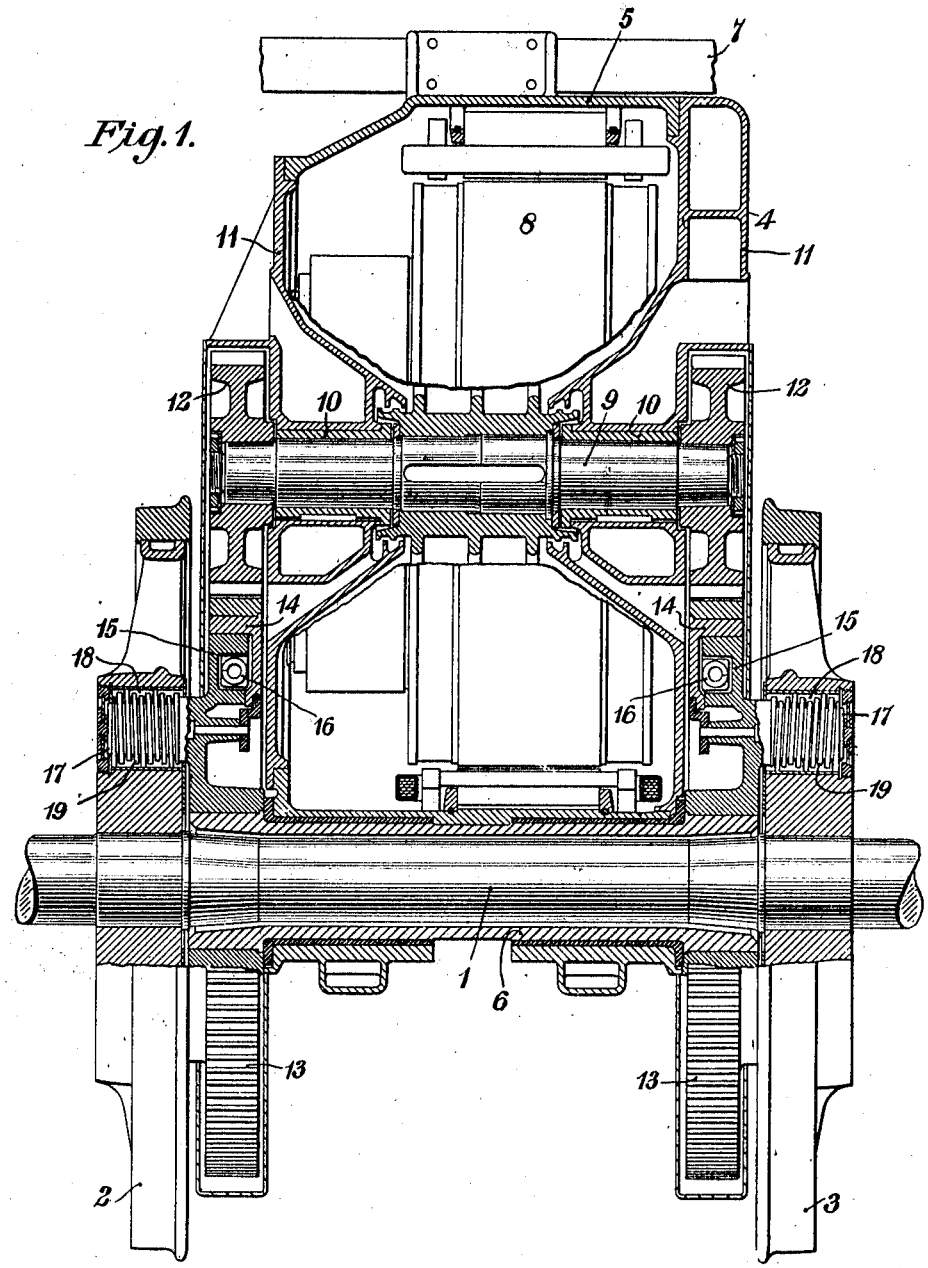
Figure 2:
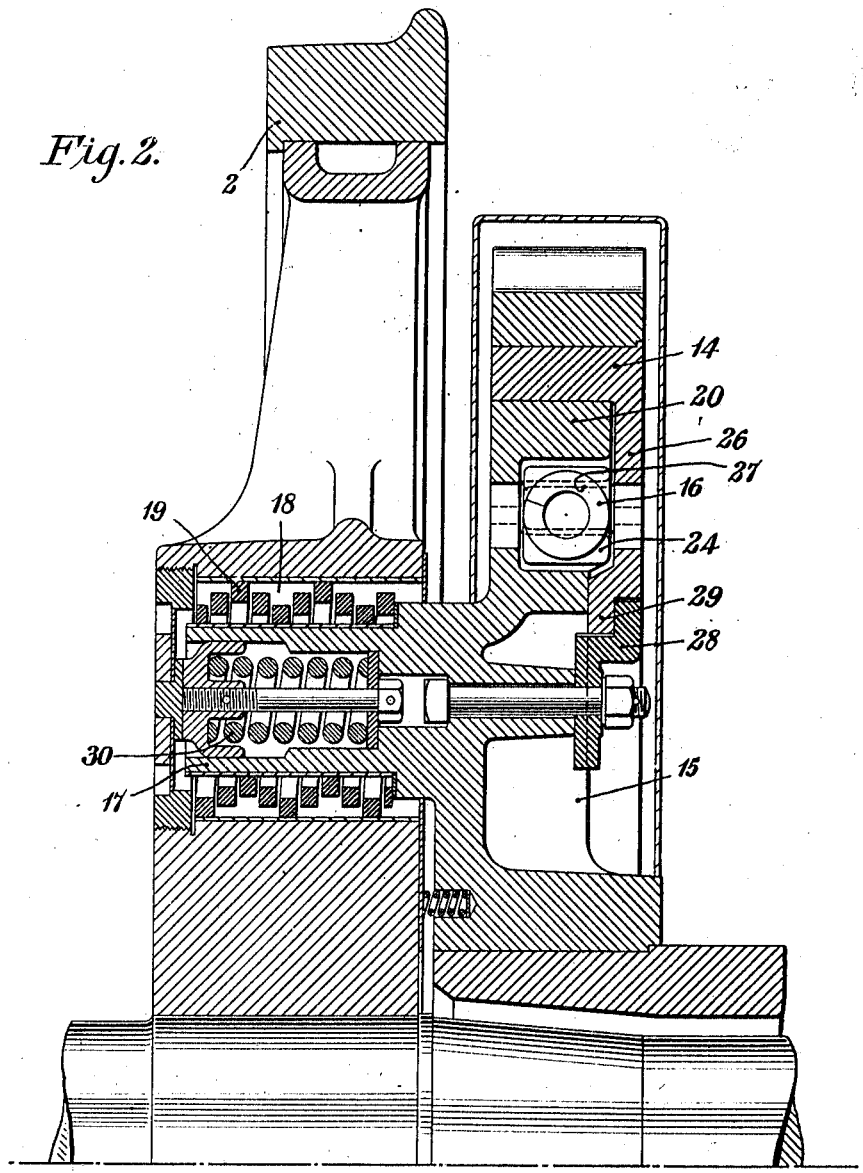
Figure 3:
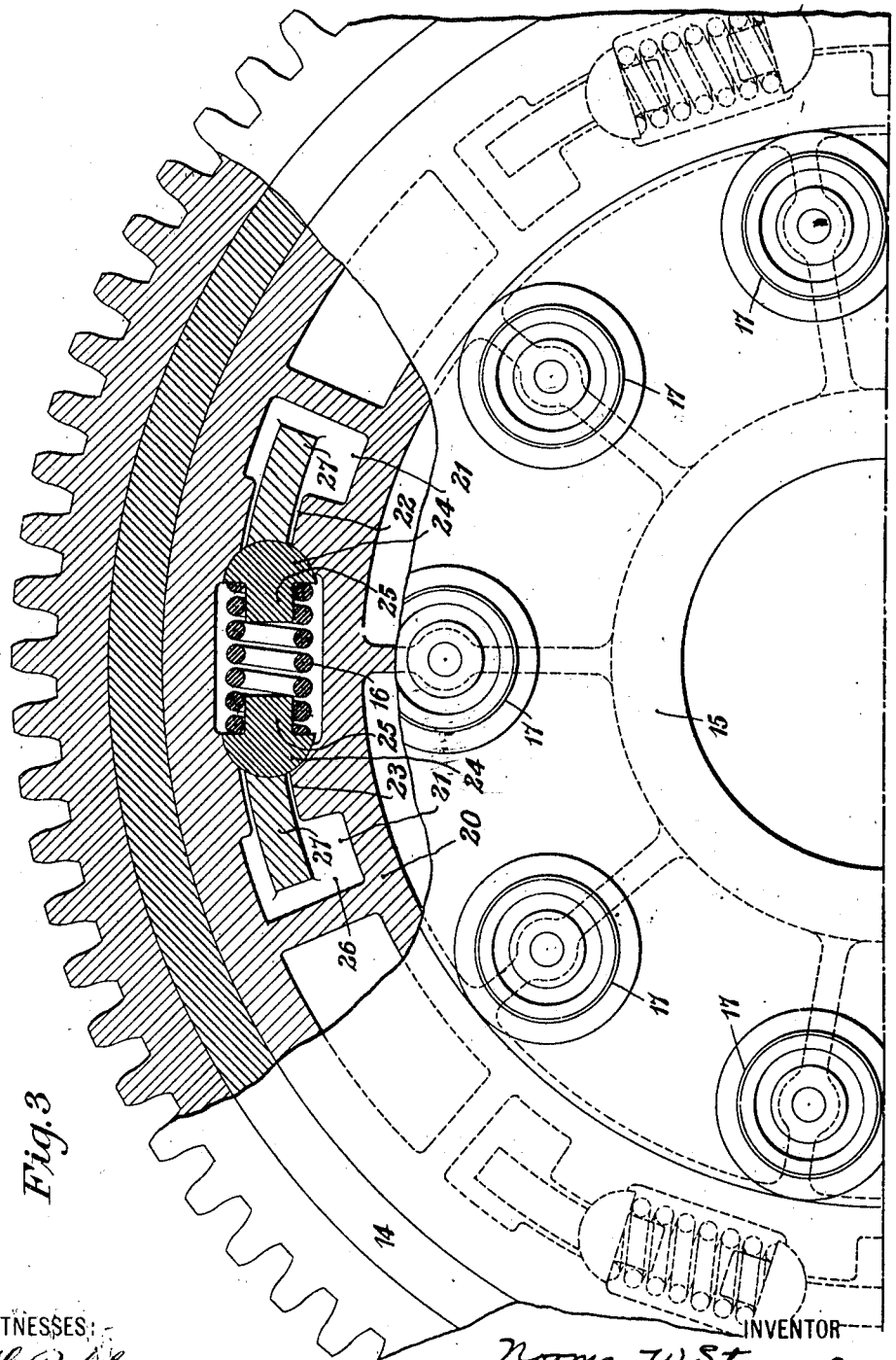

Figure 1 of the accompanying drawings is a partially sectional plan view of an electric motor mounted on a railway vehicle truck and provided with my improved driving connection. Figs. 2 and 3 are detail views, on a larger scale, of the driving gear illustrated in Fig. 1.

Referring to the drawings, the structure here illustrated comprises a truck axle 1 and driving wheels 2 and 3 secured thereto, and an electric driving motor 4 supported by and operatively connected to the driving wheels by means of a resilient gear connection.

The motor 4 comprises a stationary frame 5 one end of which is rotatably mounted on a quill or sleeve 6, which surrounds the truck axle 1, and the opposite end of which is supported by a cross bar 7 which forms a portion of the truck frame, and a rotating armature 8 secured to a shaft 9 which is mounted in bearings 10 that are suitably housed in end portions 11 of the stationary frame 5. Each end of the shaft 9 is provided with a driving pinion 12 which meshes with one of a pair of gear wheels 13 that are mounted on and form parts of the quill or sleeve 6. The rim 14 of each of the gear wheels 13 is rotatably mounted on the inner or body portion 15 and is connected to it by a plurality of springs 16 which form a resilient connection between the two parts. The body portion 15 of the gear wheel is provided with cylindrical projections 17 which extend outwardly in a direction parallel to the axis of the truck axle 1 and into a plurality of pockets 18 in the driving wheels, from the walls of which they are separated by helical springs 19, having, preferably, the form illustrated and described in Patent No. 817,133, granted April 3, 1906, to the Westinghouse Electric & Manufacturing Company, as assignee of Robert Siegfried. It will be readily understood that the helical springs 19 are relatively heavy and rigid by reason of the great weight which they support and the large forces which they transmit.

By constructing the gear wheel so as to include a relatively light resilient connection between its rim and its body and by limiting the motion permitted by positive stops, I have avoided the difficulties usually encountered when gears are arranged in multiple, and I have effectually equalized the torque exerted by the motor shaft between the two driving pinions located at its ends, so that strains, which would otherwise occur in the motor shaft and in the quill, are obviated.

It will, of course, be understood that the quill structure is not essential to my invention and that the hub member of the gear wheels may be secured directly to the truck axle, if desired.

Special reference may now be had to Figs. 2 and 3 of the drawings, in which the resilient gear wheel is illustrated in detail. The body portion 15 of the gear wheel, which is provided with the cylindrical projections 17, is also provided with an annular flange 20 having pockets 21. Each of the pockets 21 is open at one side and is constricted at two points 22 and 23, near its ends, the adjacent surfaces of the constricted portions being finished to produce sockets for the reception of semi-cylindrical blocks 24 having tangential projections 25 which extend toward each other and into opposite ends of a helical spring 16 the axis of which is also tangential. The rim member 14 of the gear wheel is provided with a flange 26 which substantially covers the side openings in the pockets 21, the flange itself being provided with projections 27 which project laterally into the pockets between their ends and the cylindrical surfaces of the blocks 24. The adjacent edges of the projections 27 are finished to fit the cylindrical surfaces of the blocks 24 with which they are adapted to engage. The arrangement of parts is such that there is only a relatively short distance between the outer ends of the projections 27 and the outer ends of the pockets 21, so that the relative rotation between the body member and the rim of the gear wheel is restricted to a small angle. On the other hand, the inner ends of the projections 27 are in close engagement with the blocks 24 so that the relative rotation referred to is opposed, in both directions, by the helical springs. The rim member 14 of the gear wheel is fitted directly upon the outer cylindrical surface of the flange 20, and is held in position by means of the flange 26 and also by means of an annular clamping ring 28 which is bolted to the body of the wheel and overlaps an inwardly extending annular projection 29 with which the flange 26 is provided. The springs 16 are preferably located at equal intervals about the circumference of the flange 20 and their number and strength may be varied to suit the conditions of service for which the driving connection is intended. The end thrust of the motor frame is taken up, in the usual manner, by means of springs 30, which are located in the hollow ends of the cylindrical projections 17 that form a part of the main driving connection between the motor and the wheels.

It is a well known fact that material variations in torque are effected by the application of single phase alternating current energy of low frequency to the driving motors of an electric vehicle, and my present resilient connection in the driving gear is specially well adapted to absorb these variations, as well as to equalize the load between the two ends of the motor and to improve the operation and prolong the life of the gear, as above indicated.

Since structural modifications may be effected within the spirit and scope of my invention, I desire that only such limitations shall be imposed as are indicated in the appended claims.

I claim as my invention:

1. In an electric vehicle, the combination with a truck axle, a pair of driving wheels secured thereto, and a motor mounted adjacent to the axle and resiliently connected to the wheels at both ends, of relatively flexible means for equalizing the torque at the two ends of the axle.

2. In an electric vehicle, the combination with a truck axle, a pair of driving wheels secured thereto, and a motor mounted adjacent to the axle and resiliently connected to the wheels at both ends, of relatively flexible springs introduced into the driving gears for equalizing the torque at the two ends of the axle.

3. In an electric vehicle, the combination with a truck axle, a pair of driving wheels secured thereto, a gear wheel resiliently connected to each driving wheel and a motor, mounted adjacent to the axle and provided with a pair of pinions to mesh with the gear wheels, of a resilient connection between the body and the rim of each gear wheel for equalizing the load between the two ends of the motor shaft.

4. In an electric vehicle, the combination with a truck axle, a pair of driving wheels secured thereto, and a motor mounted adjacent to the axle, of a plurality of sets of yielding driving connections between the motor and the axle, and relatively sensitive means for equalizing the load between the sets of connections.

5. The combination with a pair of substantially parallel shafts, of a plurality of operative connections between the shafts, each comprising a resilient gear wheel the rim of which is permitted a limited rotative adjustment relative to the hub, and a yielding connection between the gear wheel and one of the shafts.

6. The combination with a pair of shafts, of a plurality of gear connections between the shafts, each embodying means for equalizing the load between them, and a yielding means between one member of each gear connection and one of the shafts.

In testimony whereof, I have hereunto subscribed my name this 30th day of Sept., 1908.

NORMAN W. STORER.

Witnesses:
G. M. Eaton,
Birney Hines.